US012036639B2

(12) United States Patent
Wach

(10) Patent No.: US 12,036,639 B2
(45) Date of Patent: Jul. 16, 2024

(54) ADJUSTABLE FASTENER ENGAGING TOOL

(71) Applicant: Ryan Robert Wach, Valencia, CA (US)

(72) Inventor: Ryan Robert Wach, Valencia, CA (US)

( * ) Notice: Subject to any disclaimer, the term of this patent is extended or adjusted under 35 U.S.C. 154(b) by 989 days.

(21) Appl. No.: 17/009,252

(22) Filed: Sep. 1, 2020

(65) Prior Publication Data

US 2021/0069873 A1 Mar. 11, 2021

Related U.S. Application Data

(60) Provisional application No. 62/895,994, filed on Sep. 5, 2019.

(51) Int. Cl.

*B25B 13/14* (2006.01)
*B25B 13/46* (2006.01)

(52) U.S. Cl.

CPC ............ *B25B 13/14* (2013.01); *B25B 13/465* (2013.01)

(58) Field of Classification Search

CPC ..... B25B 13/44; B25B 13/463; B25B 13/465; B25B 13/5041; B25B 13/5058; B25B 13/30; B25B 13/32; B25B 13/28; B25B 13/12; B25B 13/14; B25B 13/16; B25B 13/18

See application file for complete search history.

(56) References Cited

U.S. PATENT DOCUMENTS

| | | | | | |
|---|---|---|---|---|---|
| 877,773 | A | * | 1/1908 | Holm | B25B 13/44 81/62 |
| 1,424,607 | A | * | 8/1922 | Wisenberg | B67B 7/18 81/3.39 |
| 2,765,690 | A | * | 10/1956 | Mayer | B25B 13/14 81/127 |
| 2,850,931 | A | * | 9/1958 | Conway | B25B 13/44 81/128 |
| 3,358,533 | A | * | 12/1967 | Wren | B25B 13/16 81/170 |
| 3,373,639 | A | * | 3/1968 | Van Dalen et al. | B25B 13/44 81/112 |
| 3,385,142 | A | * | 5/1968 | Cunningham | B25B 13/44 81/129.5 |
| 3,572,190 | A | * | 3/1971 | Oeland | B25B 13/14 81/127 |

(Continued)

OTHER PUBLICATIONS

TW 201041693 A, Zhang M, Wrench with stepless adjustable working size—having multiple adjustable working sizes to fit it with various specification sizes and reduce the disposition of wrench tool (Year: 2010).*

(Continued)

*Primary Examiner* — David B. Thomas
(74) *Attorney, Agent, or Firm* — Aaron T. Borrowman; YK LAW LLP

(57) ABSTRACT

An adjustable fastener engaging tool includes a plurality of jaws slidably disposed in a retainer. An actuator engages a driver jaw resulting in the jaws either moving in a first direction to enlarge a fastener-receiving aperture cooperatively formed by the jaws, or the jaws moving in a second direction to reduce the fastener-receiving aperture to grip or release a fastener.

23 Claims, 17 Drawing Sheets

(56) References Cited

U.S. PATENT DOCUMENTS

| | | | | | |
|---|---|---|---|---|---|
| 3,664,213 | A * | 5/1972 | Anati | B25B 13/46 | 81/90.2 |
| 4,237,756 | A * | 12/1980 | Maclay | B25B 13/10 | 81/185 |
| 4,324,160 | A * | 4/1982 | Maclay | B25B 13/107 | 81/185 |
| 5,016,503 | A * | 5/1991 | Morton | B25B 13/22 | 81/126 |
| 5,090,273 | A * | 2/1992 | Fossella | B25B 13/463 | 81/57.13 |
| 7,478,577 | B1 * | 1/2009 | Wheeler | B25B 13/18 | 81/63 |
| 7,748,298 | B2 * | 7/2010 | Brown | B25B 13/10 | 81/58 |
| 7,992,470 | B2 * | 8/2011 | Brown | B25B 13/44 | 81/58 |
| 8,402,863 | B2 * | 3/2013 | Brown | B26D 3/169 | 81/90.1 |
| 8,434,390 | B2 * | 5/2013 | Cross | B23G 1/265 | 81/60 |
| 8,833,209 | B2 * | 9/2014 | Brown | B25B 13/10 | 81/90.1 |
| 8,893,592 | B2 * | 11/2014 | Womack | B25B 13/20 | 81/128 |
| 9,475,178 | B2 * | 10/2016 | Pelletier | B25B 13/18 | |
| 9,555,524 | B2 * | 1/2017 | Chen | B25B 13/466 | |
| 9,889,544 | B2 * | 2/2018 | Chern | B25B 13/463 | |
| 10,399,213 | B2 * | 9/2019 | Wang | B25B 13/14 | |
| 10,427,280 | B2 * | 10/2019 | Zelniker | B25B 23/108 | |
| 10,513,012 | B2 * | 12/2019 | Womack | B25B 13/44 | |
| 10,737,370 | B2 * | 8/2020 | Gehling | B25B 13/32 | |
| 10,773,363 | B2 * | 9/2020 | Liao | B25B 23/0007 | |
| 2009/0272237 | A1 * | 11/2009 | Pirseyedi | B25B 13/44 | 81/125 |
| 2013/0213185 | A1 * | 8/2013 | Brown | B23D 21/10 | 81/52 |
| 2017/0095908 | A1 * | 4/2017 | Elmi | B25B 13/14 | |
| 2018/0043515 | A1 * | 2/2018 | Zelniker | B25B 23/108 | |
| 2018/0229348 | A1 * | 8/2018 | Womack | B25B 13/18 | |
| 2018/0281159 | A1 * | 10/2018 | Carnesi | B25B 13/463 | |
| 2018/0369997 | A1 * | 12/2018 | Chen | B25B 13/463 | |
| 2020/0147763 | A1 * | 5/2020 | Lee | B25B 13/28 | |

OTHER PUBLICATIONS

TW 201041693 A, Zhang M, Wrench with stepless adjustable working size (Year: 2010).*

* cited by examiner

ADJUSTABLE FASTENER ENGAGING TOOL

RELATED APPLICATIONS

This application claims the benefit of U.S. Provisional Application No. 62/895,994, filed Sep. 5, 2019.

BACKGROUND OF THE INVENTION

The present invention generally relates to fasteners and tools. More particularly, the present invention relates to an adjustable fastener engaging tool, such as an adjustable closed-end wrench or socket tool.

A wide variety of fasteners, such as nuts and bolts, are used to interconnect objects. A nut or a head of a bolt has a multi-faceted peripheral edge, typically a hexagonal-shaped peripheral edge. These facets are gripped by a variety of tools to fasten and unfasten the fastener and connect or detach the associated components.

One such tool is a box-end wrench having an open-ended wrench on one end thereof and a closed end wrench on the other. These come in a variety of sizes corresponding to the size of the nut or fastener. In other cases, a socket, which is removably attached to a ratchet, is used for gripping the fastener. Once again, these come in a variety of sizes which correspond with the size of the fastener. A downside of these fasteners, however, is that a large number of sets of wrenches and sockets must be available to engage the fasteners of differing sizes. This also requires mating the proper wrench or socket with the fastener, which often involves trial and error to arrive at the correct size.

In order to overcome the downsides of box-end wrenches and sockets, tool designers and manufacturers have created and employed several mechanisms to achieve an adjustable wrench or socket. One example is an adjustable open-end wrench, commonly referred to as a crescent wrench, which employs a fixed side and a worm screw actuated movable side. By manually actuating the worm screw, such as by using one's thumb, the movable side moves towards or away from the fixed side, in order to effectively grip two sides or facets of the fastener. Such crescent wrenches, however, while convenient to use, only grips two faces and two corners of the fastener, which limits the amount of torque that can be applied to the fastener without damaging the fastener.

Another "one size fits most" wrench is a plier-type closed-end wrench, which employs six teeth that uniformly slide inward towards the center as the plier handles are closed. This wrench is sold under the Bionic Wrench™ name. However, the Bionic Wrench™ requires the closing of two handles, as with a pair of pliers, to actuate the teeth and close the wrench around a fastener. This limits the grip on the fastener to the gripping strength of the user. This also limits the rotational range in use due to the two handles used, versus only a single handle. Moreover, the teeth grip the middle of each fastener face and none of the corners, again limiting applied torque by the wrench.

Yet another "one size fits most" tool comprised a socket design with a multiple of spring-loaded pins housed within the socket. The pins slide upward to conform to the shape of various sized fasteners. Being a socket, however, it required the use of a ratchet in order to be used. Moreover, it is limited in the resolution of the fit of the pins to the respective fastener due to the limited minimal size of each pin and spring. The socket will only securely grip a few sizes of fasteners, while less securely gripping other sizes within its range. Another limitation is that the socket only grips at the contact points of each pin to the fastener, thus not completely gripping any face or corner of the fastener.

Therefore, there is a continuing need for an improved tool that can provide a secure grip for various sized multi-faceted fasteners, such as hexagonal fasteners. Such a tool should preferably securely grip all faces and corners of the fastener. Such a tool should also be simple and convenient to operate, with as few as a single handle. Such a tool should also provide maximal rotational range of use, while preserving the integrity of the fastener in use. The present invention fulfills these needs and provides other related advantages.

SUMMARY OF THE INVENTION

The present invention is directed to a fastener engaging tool which is adjustable to engage a wide variety of sized fasteners. The tool of the present invention is easily adjusted in order to securely grip the facets and corners of multiple sized fasteners, thus eliminating the need for large sets of wrenches or sockets.

The tool of the present invention generally comprises a retainer having a plurality of jaws slidably disposed therein. An actuator engages at least one of the jaws for selectively slidably moving the jaws in the retainer. Adjacent jaws push against one another as the actuator is actuated, resulting in the jaws either moving in a first direction to enlarge a fastener-receiving aperture cooperatively formed by the jaws, or the jaws moving in a second direction to reduce the fastener-receiving aperture. The fastener-receiving aperture has a configuration matching a multi-faceted peripheral edge of the fastener.

Typically, the jaws comprise a driver jaw engaged with the actuator and a plurality of follower jaws. Each jaw comprises an end face and an inner face, wherein the end face of a jaw slidably engages an inner face of an adjacent jaw as the jaws are moved. The inner faces of the jaws cooperatively define the fastener-receiving aperture and engage the peripheral edges and corners of the fastener.

Typically, the plurality of jaws comprises six jaws. The six jaws cooperatively define a hexagonal-shaped fastener-receiving aperture.

The retainer includes a groove defining a track that receives a guide portion of each jaw therein. A retainer plate may cover at least a portion of the jaws in the retainer. The retainer plate may have a groove defining a track that receives a guide portion of each jaw therein.

The actuator may comprise a thumb screw. A selector may be operably coupled to the actuator for selecting forward or reverse movement of the actuator.

The retainer may be connected to a handle. The retainer, jaws and handle cooperatively form a closed-end wrench.

In another form, the retainer, jaws and retainer plate cooperatively form an adjustable socket attachable to a ratchet.

In another form, the actuator comprises a manually actuated lever pivotally attached to the handle and having an end engageable with a driver jaw.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in an adjustable fastener engaging tool used to fasten and loosen fasteners, including nuts, bolts and the like. The tool of the present invention is particularly configured and designed to engage multi-faceted fasteners, and particularly hexagonal fasteners which have a hexagonal outer periphery or cross-section. The tool described herein solves many problems associated with the several common adjustable and fixed wrenches and sockets currently available, eliminating the need for multiple sizes of closed-end wrenches and sockets by providing an adjustable multi-faceted opening to fit a wide range of fasteners. The tool of the present invention also overcomes the shortcomings of other adjustable wrenches, plier-type wrenches, and so-called "universal" sockets as the tool of the present invention is configured to contact all facets and corners of the fastener in an effective manner.

Figure 1:
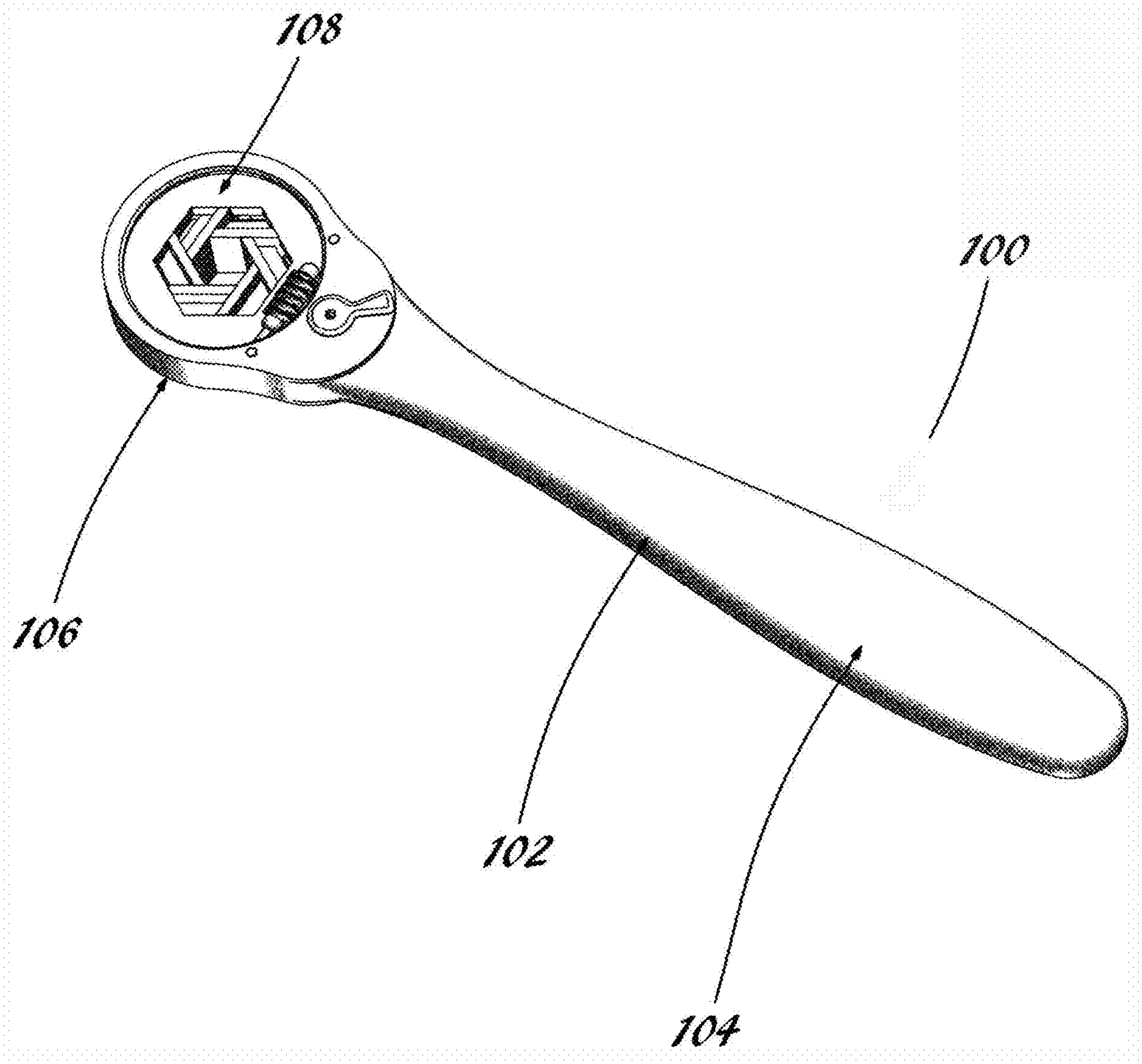
FIG. 1 is a top perspective view of a tool, in the form of a closed-end wrench, embodying the present invention.

With reference now to FIG. 1, a tool 100 in the form of a closed-end wrench embodying the present invention is shown. The tool 100 includes a handle 102 defining a gripping portion 104 at one end, and an adjustable jaw assembly holding or retaining end 106 at the opposite end thereof. An adjustable jaw assembly 108 is shown operably connected to the handle 102.

Figure 2:
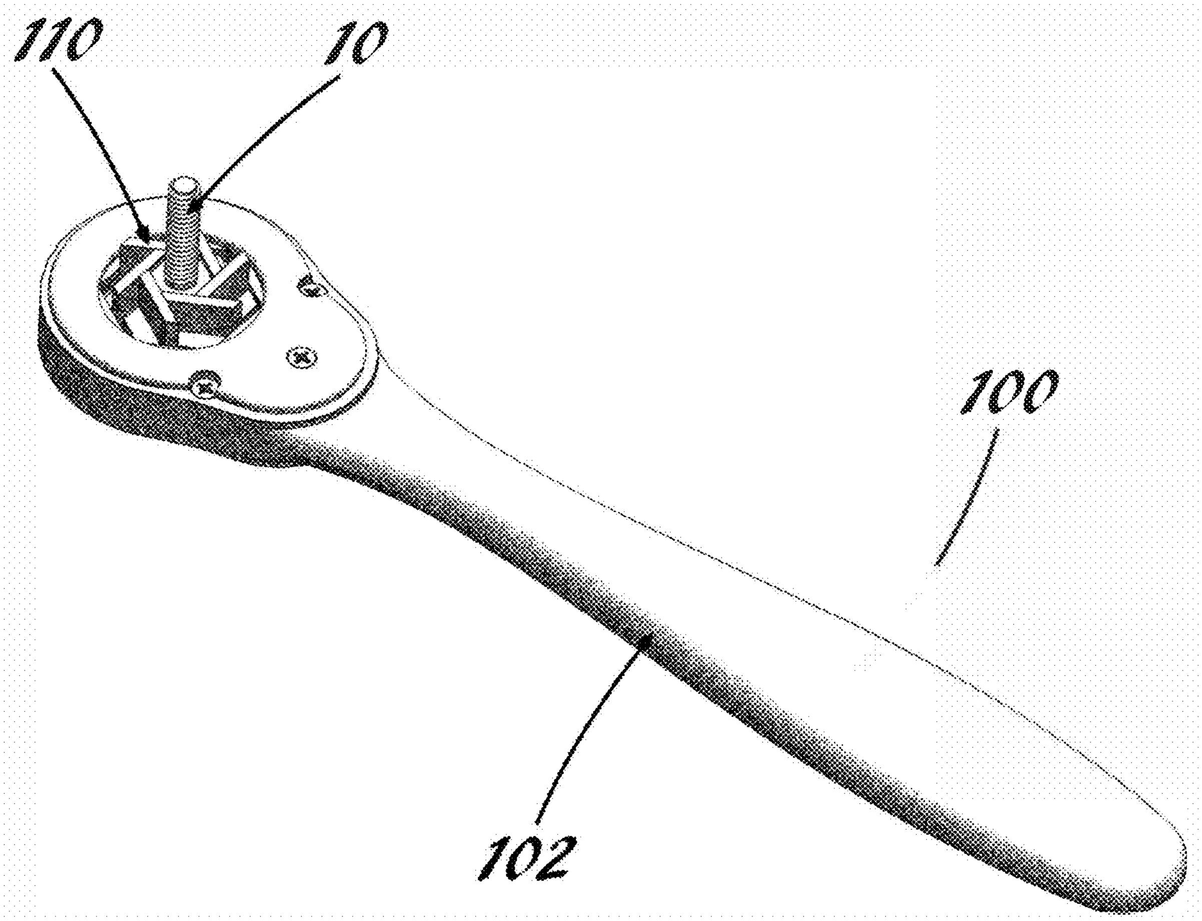
FIG. 2 is a bottom perspective view of the wrench of FIG. 1, illustrating jaws thereof moved into engagement with a fastener, in accordance with the present invention.
Figure 4:
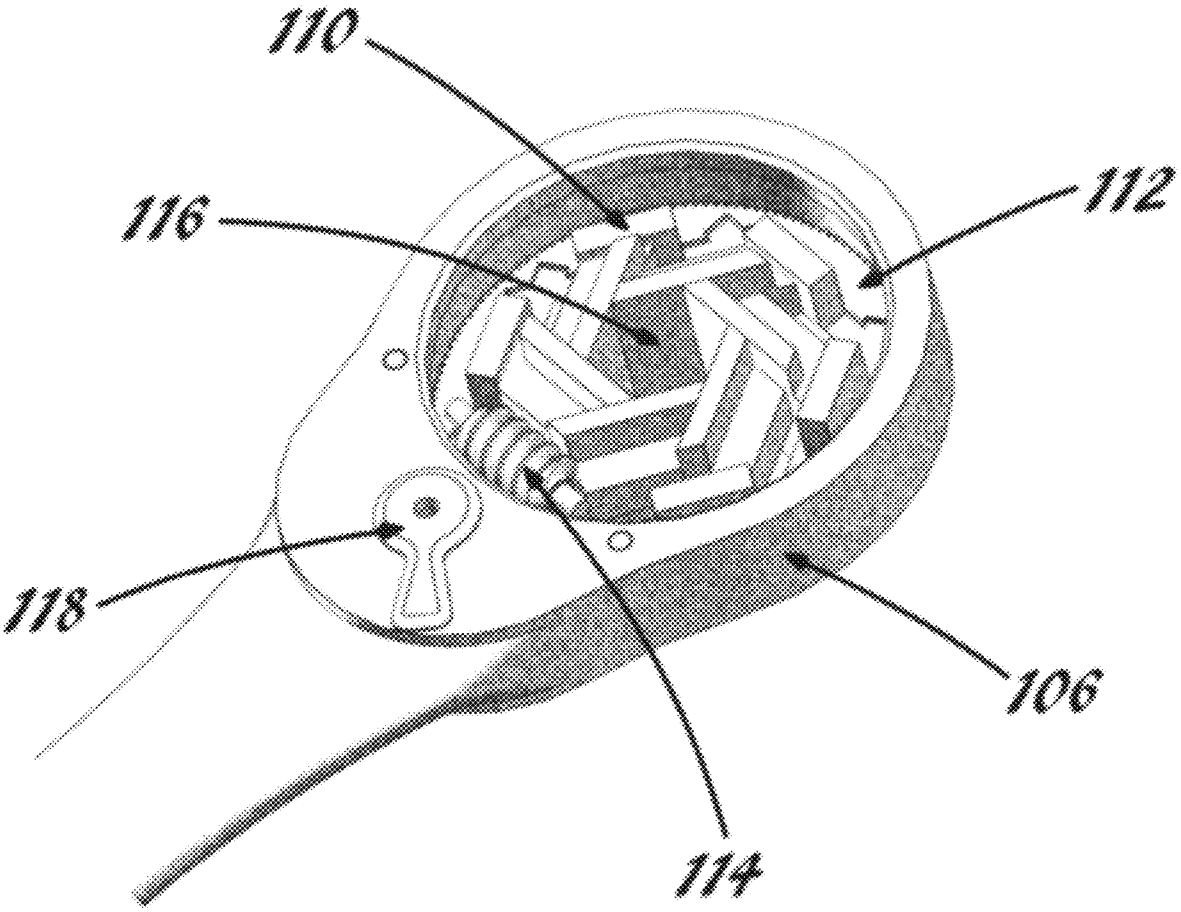
FIG. 4 is an enlarged perspective view of a jaw portion of the wrench.

The adjustable jaw assembly 108 in FIG. 1 is shown in a partially open state. With reference to FIG. 2, it is shown that jaws 110 of the adjustable jaw assembly 108 have been moved into contact with the outer peripheral edge or facets of a bolt 10 having a hexagonal head. FIG. 4 is an enlarged view of the end 106 of the wrench housing the adjustable jaw assembly, illustrating a plurality of jaws 110 operably disposed within a retainer 112 which rests within the housing end 106 of the handle 102. Although not limited to such, typically the closed end 106 of the handle housing the adjustable jaw assembly is generally circular, as is the retainer 112.

The retainer 112 may have a peripheral edge which engages an inner surface or wall of the housing 106 so as to remain immobile during operation. The retainer 112 may be held in the housing end 106 of the handle by many means, including snap hooks, chemical bonding agents, such as glue or the like, welding, etc.

An actuator 114, such as the illustrated rack and worm screw or screw pin, is used to selectively move the jaws 110 in a first direction in order to enlarge a fastener-receiving aperture 116 cooperatively formed by the jaws 110, or move the jaws in a second direction to reduce the size of the fastener-receiving aperture 116. Rotating the screw actuator 114 translates into linear motion of the jaws 110 in order to open or close the jaws 110, as will be more fully described herein. The actuator may comprise instead of a worm screw and rack a threaded screw with a cylinder and pin, or any other actuator which achieves the purpose of moving the driver jaw in a selective manner. A selector 118 may be used to enable the actuator to move in the first direction or second direction while locking or preventing movement in the opposite direction to secure the jaws 110 in a desired location and state.

Figures 3A, 3B, 3C, 3D, 3E:
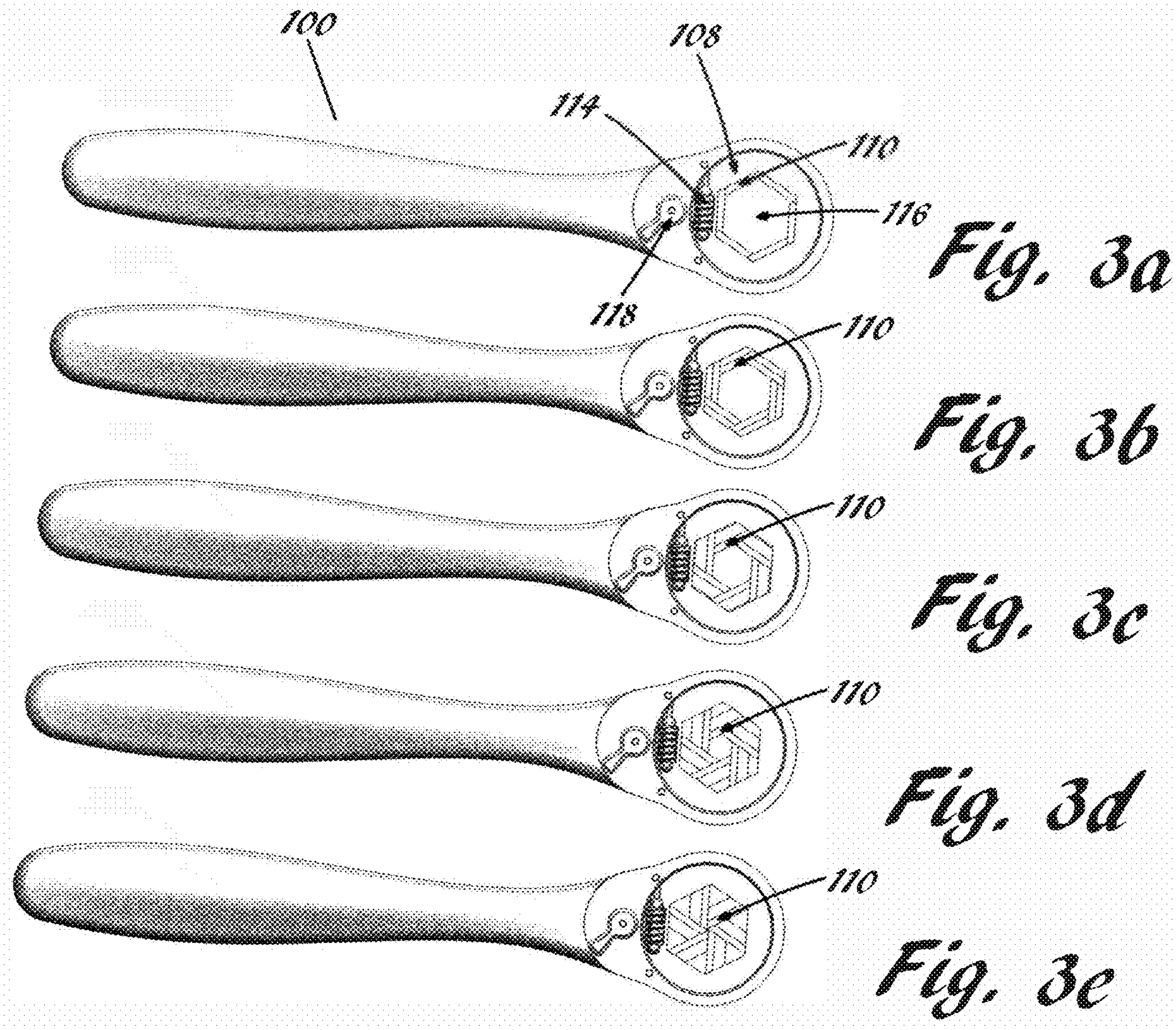
FIGS. 3*a*-3*e* are top plan views of the wrench of FIG. 1, illustrating the opening and the closing of the jaws, in accordance with the present invention.

FIGS. 3*a*-3*e* illustrate the closing of the jaws from a completely open state illustrated in FIG. 3*a*, wherein the fastener-receiving aperture 116 is in its largest state, to a progressively closed state in FIG. 3*e*, wherein the jaws 110 have been moved into a closed position. The completely closed position of the jaws 110, as illustrated in FIG. 3*e*, may completely close the fastener-receiving aperture, or the completely closed state of the jaws 110 may define a selected minimal sized fastener-receiving aperture size corresponding to a relatively small fastener. It will be understood that fasteners having a size corresponding to any of the fastener-receiving aperture sizes between the fully open position and towards the fully closed position can be engaged by the tool of the present invention in order to tighten or loosen the fastener, as needed.

Figure 5:
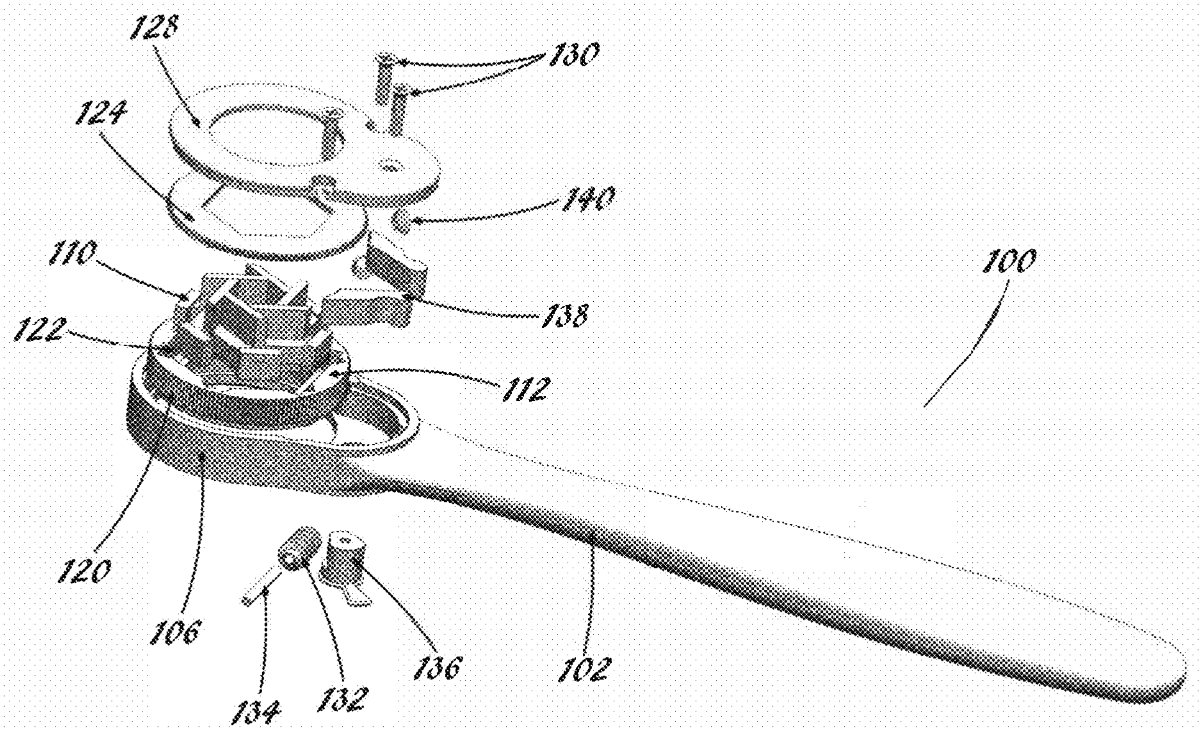
FIG. 5 is an exploded perspective view of a tool embodying the present invention.

With reference now to FIG. 5, an exploded perspective view of the tool 100 is shown. It can be seen that the handle's closed end 106 defining the open-faced housing has inner shoulders, ledges, and surface configurations to receive and accommodate the various components, including the adjustable jaw assembly and the retainer 112 which may have a generally circular or ring configuration. It can also be seen that the retainer 112 has a series of outer teeth 120 which engage an inner surface of the closed end housing 106 so as to hold the retainer 112 firmly in position and prevent rotation thereof during operation of the tool 100. The jaws 110 are shown slightly exploded from the retainer 112, which has an open-faced groove 122 forming a track in which a portion of the jaws 110 slidably travel, as will be more fully illustrated and described herein.

A retainer plate 124 may be used to cover at least a portion of the jaws 110 and the retainer 112. The retainer plate 124 may also include open-faced grooves 126 forming a track in which a portion of the jaws slidably move. It will be understood that the retainer plate 124 is an optional component, but which is incorporated to assist in the retention and the controlled movement of the jaws 110. A cover plate 128, which is secured to the handle 102 by means of pins, screws, or other fasteners 130 and which overlies the adjustable jaw assembly, and particularly the retainer 112 and at least a portion of the jaws 110 is used to secure the adjustable jaw assembly components within the open-faced housing defined by the closed-end 106 of the handle 102. The invention may incorporate the use of both the retainer plate 124 as well as the cover plate 128, or just the cover plate 128. The cover plate 128 may, when the retainer plate 124 is not incorporated, include open-faced grooves forming a track in which a portion of the jaws 110 may slidably move. Alternatively, as the jaws 110 are sufficiently securably disposed within the retainer 112, such an upper track may be deemed unnecessary.

With continuing reference to FIG. 5, the thumb screw 132 and pin 134 of the actuator 114 are also shown. It will be understood that other types of actuators may instead be incorporated into the invention which enable selective movement of the jaws 110 into an open and closed configuration. The selector 118, which is used to select the forward or reverse movement of the actuator, such as thumb screw 132, may include a switch 136 which can be pivoted into two positions, and a pair of pawls 138 and springs 140 which become engaged with the switch 136 as it is pivoted to either permit or prohibit movement of the actuator, such as enabling the thumb screw 132 to only rotate in the selected direction for either opening or closing the jaws 110.

It will be noted that the jaws 110 are accessible through the open-faced closed end 106 of the handle 102, as well as the openings formed by the generally circular retainer plate 124 and/or cover plate 128. The jaws 110 may be substantially flush with the cover plate 128 when used, or extend outwardly therefrom, as illustrated in FIG. 2. A benefit of the jaws protruding beyond the handle or retainer plate and/or cover plate is that the handle can clear neighboring fasteners or other objects up to the protruding length of the jaws, which such clearance can be advantageous.

Figure 6:
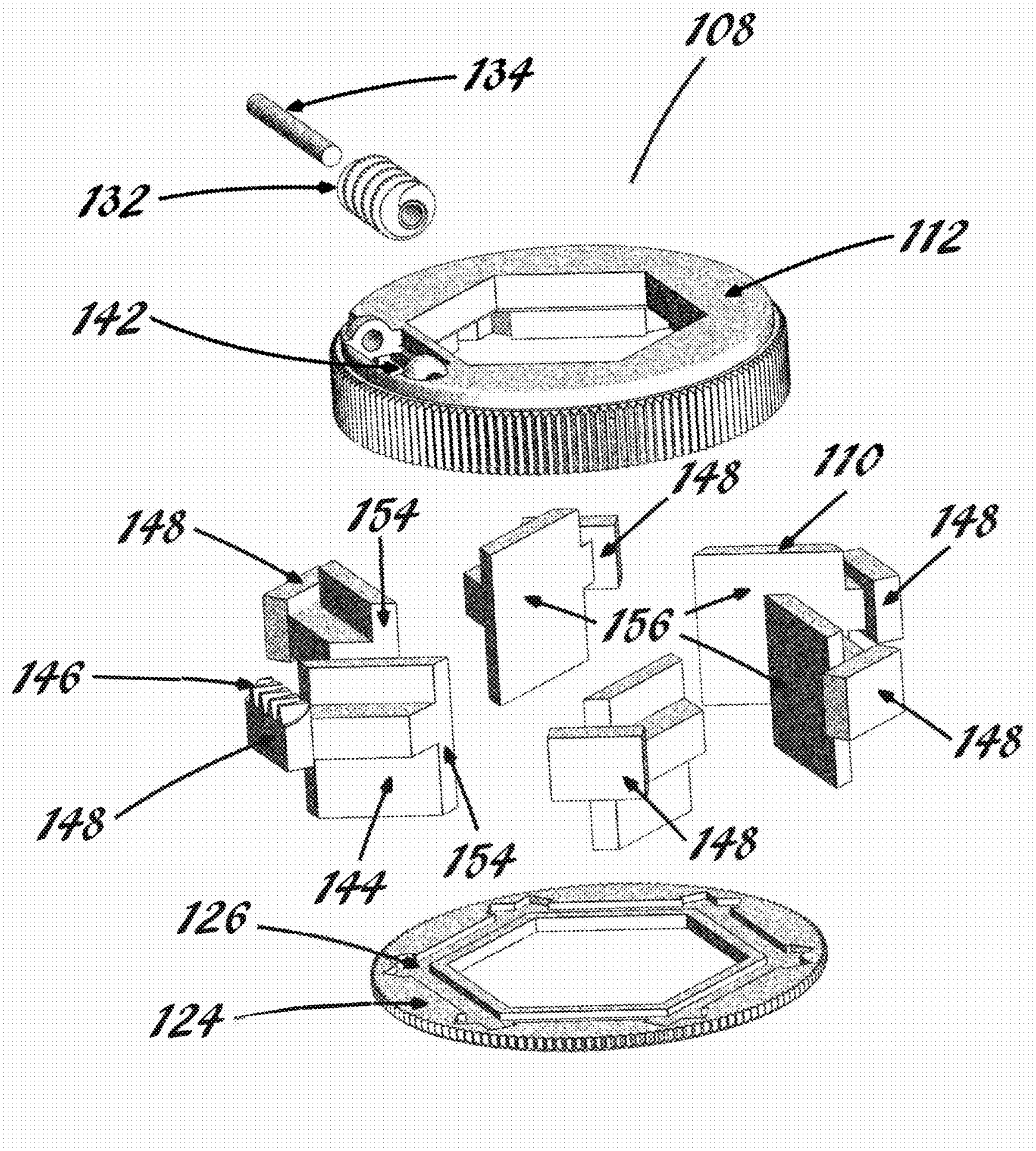
FIG. 6 is a is an exploded perspective view of an adjustable jaw assembly embodying the present invention.
Figure 7:
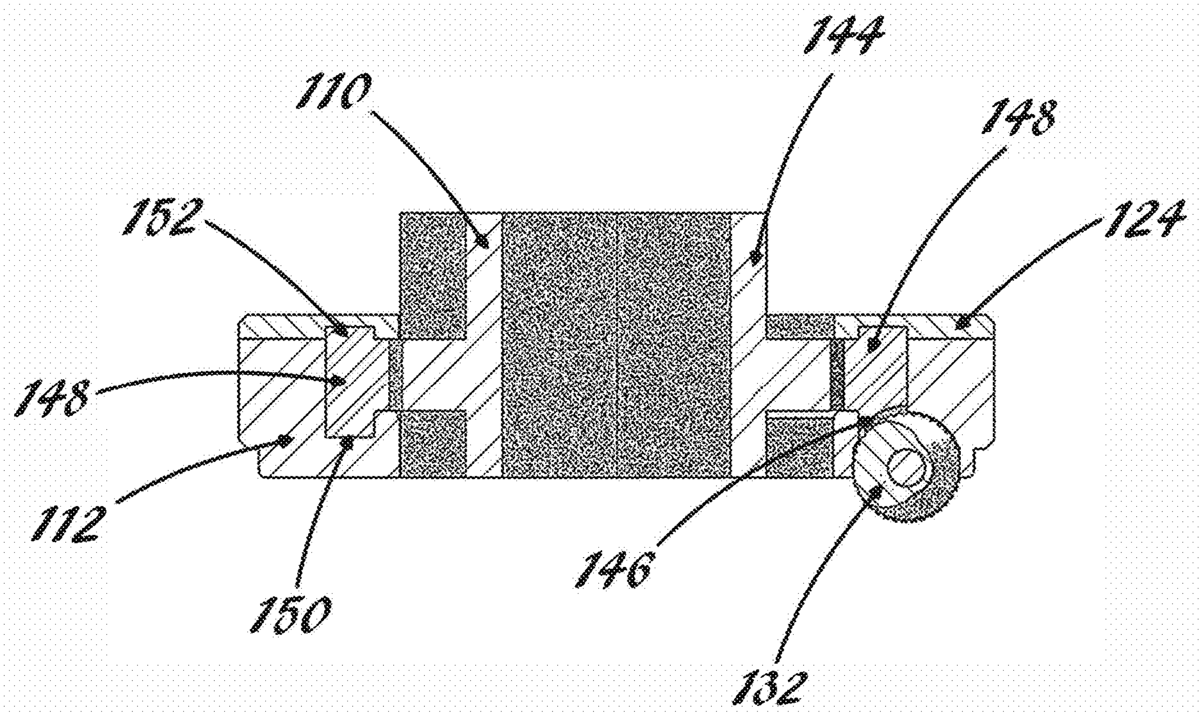
FIG. 7 is a cross-sectional view of the adjustable jaw assembly of the present invention.
Figure 10:
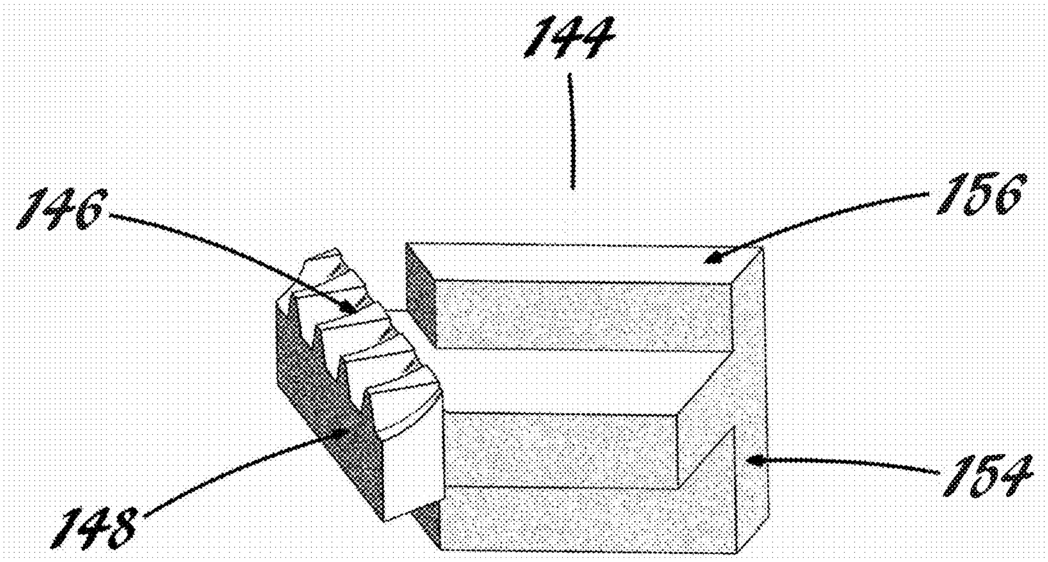
FIG. 10 is a perspective view of a driver jaw of the present invention.
Figure 11:
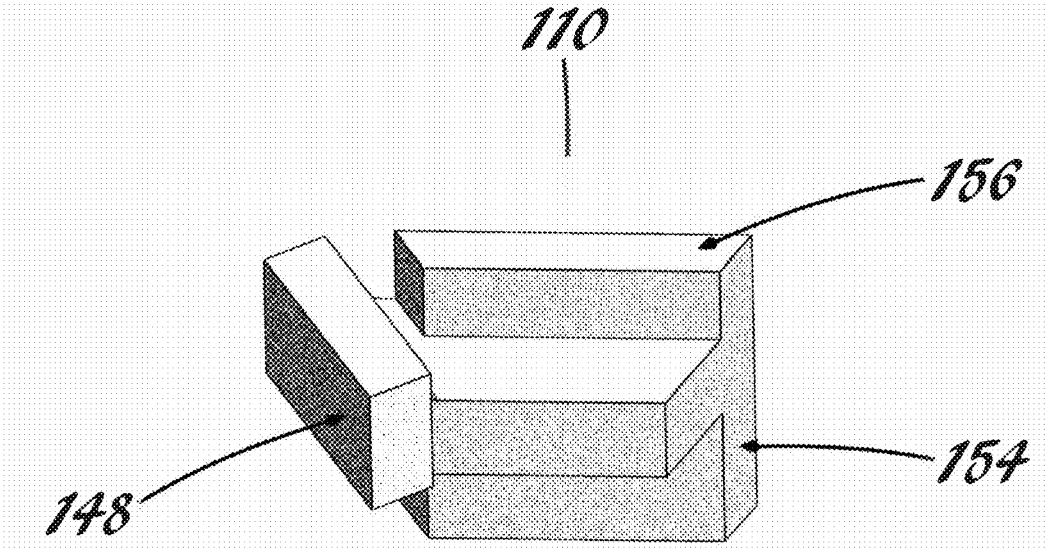
FIG. 11 is a perspective view of a follower jaw of the present invention.

With reference now to FIG. 6, an exploded perspective view of the component parts of the adjustable jaw assembly 108 is shown. Such component parts include the actuator, illustrated as the thumb screw 132 and pin 134 which are housed within a recess 142 of the retainer 112 so as to be accessible for manual movement, such as by one's thumb, while also extending into engagement with at least one of the jaws 110, as illustrated in FIG. 7. More particularly, as illustrated in FIGS. 6 and 10, in the illustrated embodiment, one of the jaws comprises a driver jaw 144 which engages with the actuator 114, in this case the thumb screw 132. A series of notches forming a rack 146 is formed in the guide portion 148 of the driver jaw 144. The guide portion 148 is disposed within the open-faced groove track 122 of the retainer 112. Each of the jaws 110 has such a guide portion 148 extending therefrom which is sized and configured so as to fit within the retainer track 122 so as to slidably move along a length of the retainer track 122 during operation of the invention.

Figure 9:
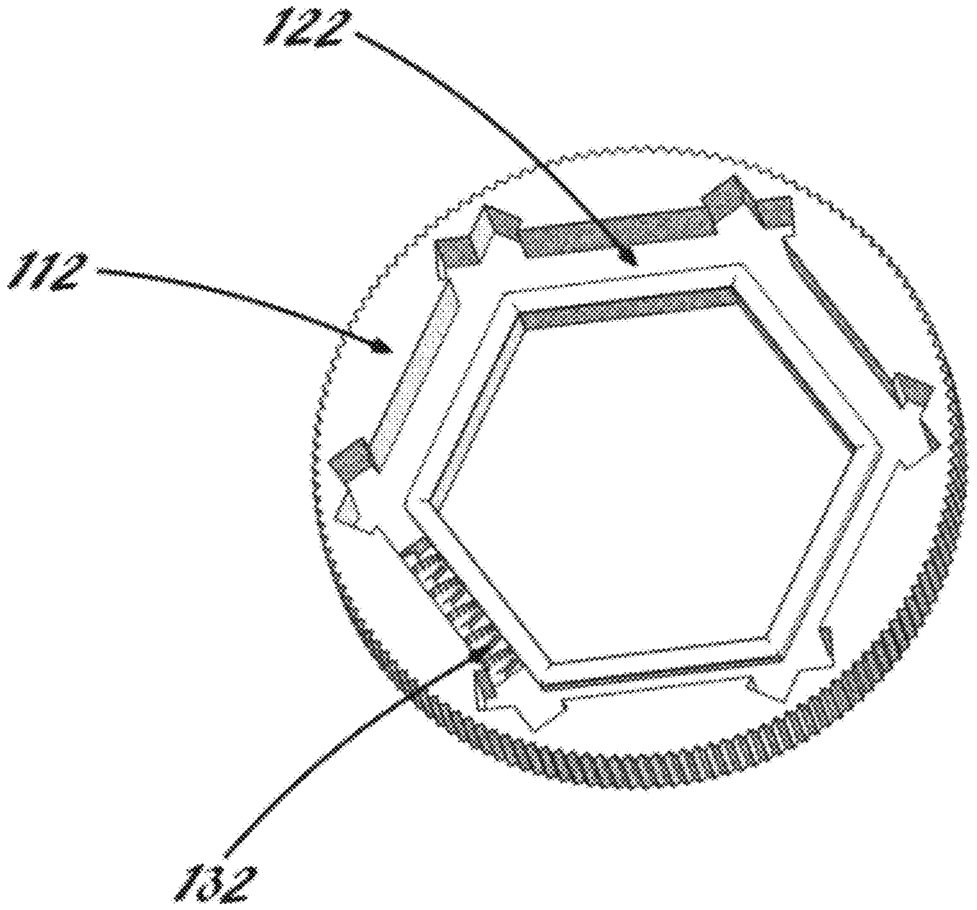
FIG. 9 is a top perspective view of the adjustable jaw assembly with the jaws removed therefrom.

With reference now to FIG. 9, a top view of the retainer 112 is shown with the jaws removed therefrom so as to show the open-faced groove forming the retainer track 122. It will be seen that the track 122 is comprised of a number of grooved track segments corresponding to the total number of jaws, in this case six. Thus, at least a portion of the guide portion 148 of a jaw 110 is disposed within a respective segment of the guide track 122 so as to travel a length of the segment of the guide track 122 during operation of the tool. As there are six jaws 110 in the illustrated embodiment, there are six track segments forming a generally hexagonal track 122. A similar configuration can be seen in the track 126 of the retainer cover 124. Thus, when the retainer cover 124 is utilized, the guide portions 148 of each jaw 110 has one segment thereof 150 residing in the retainer track 122 and the generally opposite segment thereof 152 residing and traveling in the retainer cover track 126. If the retainer cover 124 is not incorporated, however, guide portion 148 of each jaw 110 is sufficiently disposed and secured within the track 122 to enable proper movement of the jaws and operation of the invention. As mentioned above, incorporation of the retainer plate 124 and its track 126 provides additional alignment and retention of the jaws.

Figure 8:
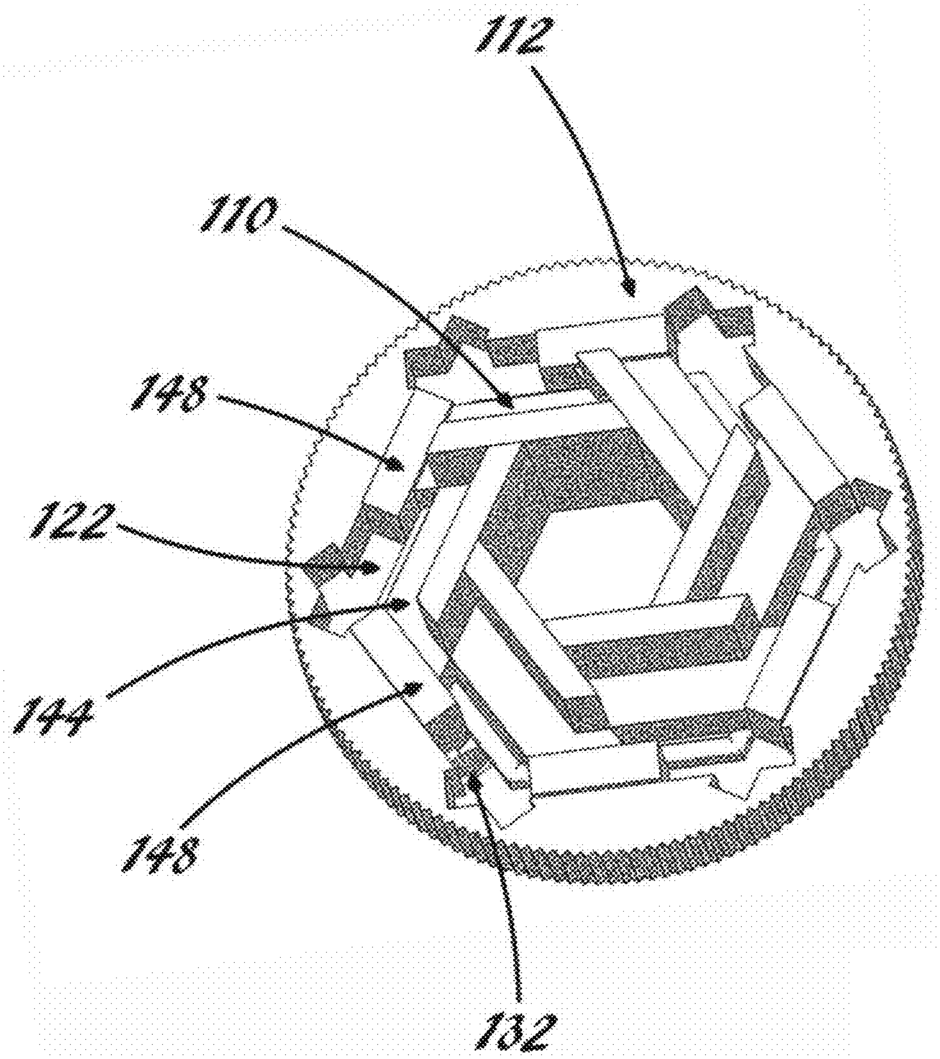
FIG. 8 is a top perspective view of the adjustable jaw assembly of the present invention.

With reference to FIGS. 7-9, the thumb screw 132 of the actuator extends into the segment of the track 122 of the retainer 112 in which the driver jaw 144 is disposed such that the rack 146 of the guide portion 148 of the driver jaw 144 is engaged with the teeth of the thumb screw 132. The guide portions 148 of the remaining jaws 110, sometimes referred to herein as follower jaws, are inserted into their respective segment of the track 122 until all of the jaws are assembled in the track, as illustrated in FIG. 8. It can be seen in FIG. 8 that the guide portions 148 are smaller in length than their respective track segments, to permit the guide portion 148 to move along a length of the segment of the track 122 as the jaws are moved between open and closed positions. The end of the track segments also extend past one another slightly to permit full range of motion of the guide portions 148 of each jaw as the jaws are moved between their most open position and their most closed position.

With reference now to FIGS. 10-13, the driver jaw is identified by the reference number 144 and the remaining jaws, or follower jaws, by the reference number 110, although all of the jaws may be generally referred to by the reference number 110. In each case, every jaw 110, as mentioned above, includes a guide portion 148 which slidably moves within the retainer track 122. Each jaw 110 also includes an end face 154 and an inner face 156.

Figure 12:
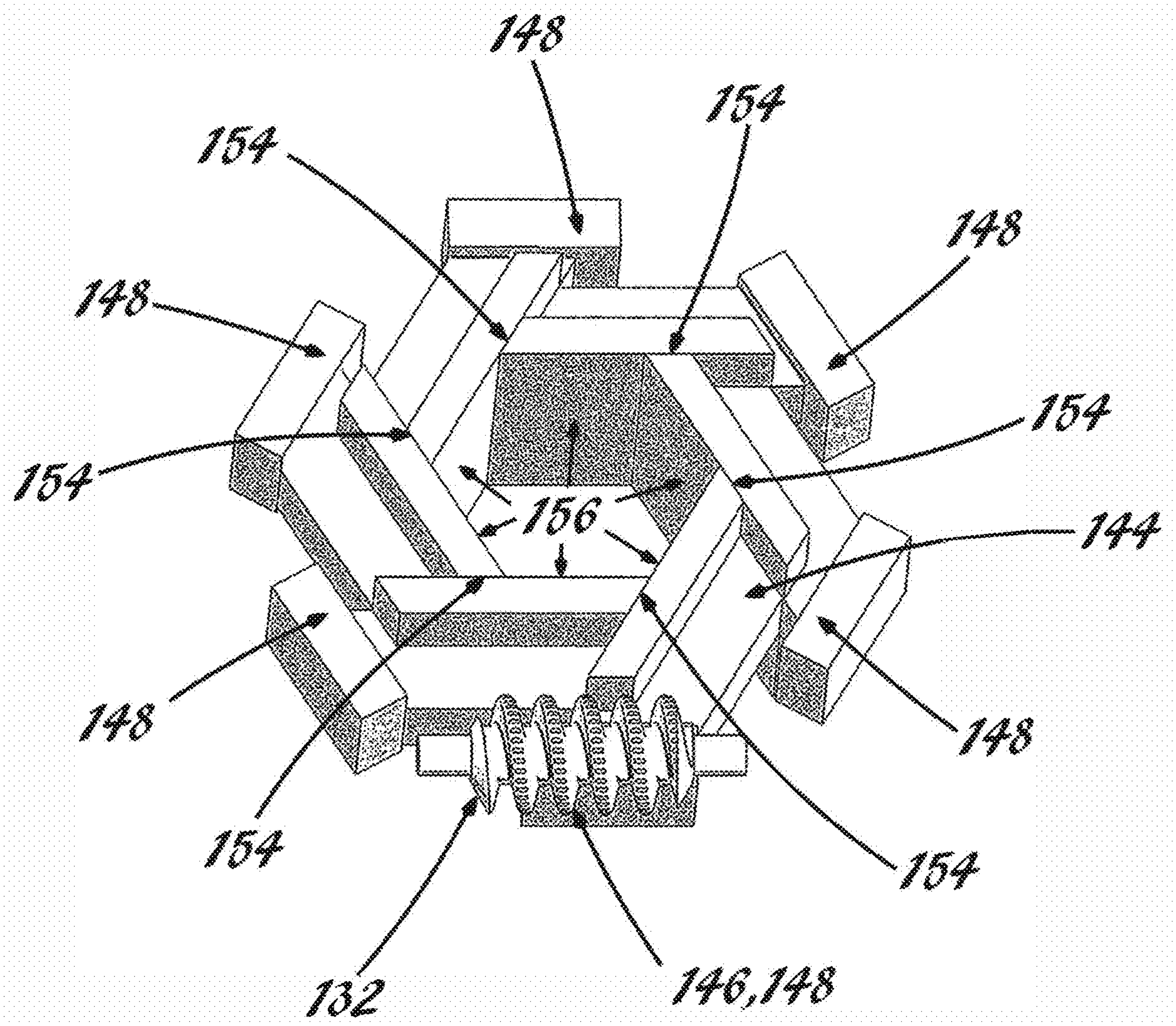
FIG. 12 is a perspective view of an actuator and the jaws forming a partially open fastener-receiving aperture, in accordance with the present invention.
Figure 13:
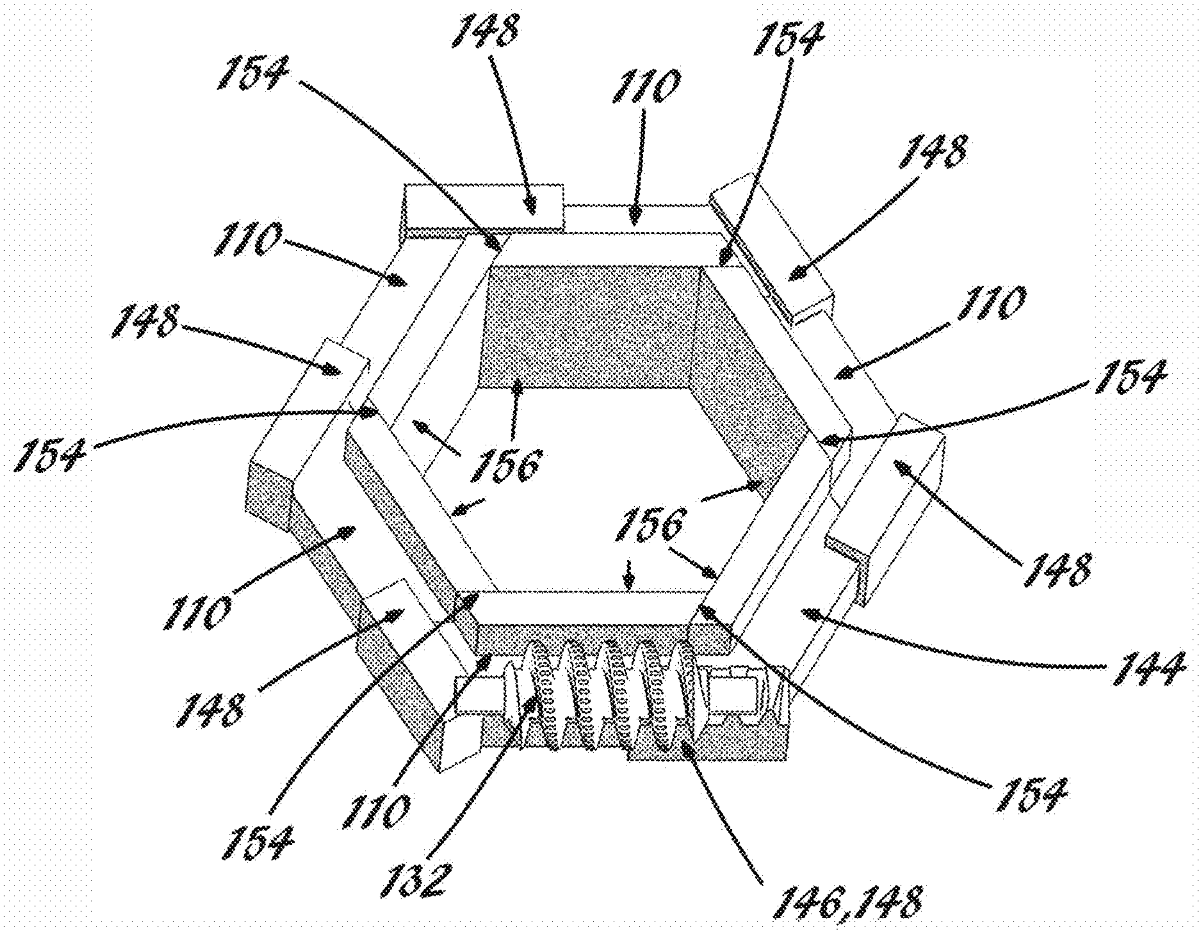
FIG. 13 is a perspective view similar to FIG. 12, illustrating the jaws in a fully open position.

In operation, as can be seen in FIGS. 12 and 13, an end face 154 of one jaw is in slidable contact with the inner face 156 of an adjacent jaw. Typically, as illustrated, the end faces 154 are formed at an acute or obtuse angle such that when the jaws 110 are assembled within the retainer 112 the end face 154 is in contact with the inner face 156 of the adjacent jaw and can slidably move along the inner face 156 of the adjacent jaw as a force is applied therebetween by one of the jaws, resulting in the jaws moving linearly within the track 122 in either a first direction to open the jaws 110 or close the jaws 110 so as to enlarge or reduce the fastener-receiving aperture cooperatively formed by the jaws.

Such movement is illustrated in FIGS. 12 and 13. As the screw 132 of the actuator is rotated, this rotational movement causes a linear movement of the driver jaw 144 due to its interaction with the rack 146 of the driver jaw. Such movement moves the driver jaw 144 in a given direction linearly within its segment of the track 122. Movement of the driver jaw 144 causes its end face 154 or inner face 156 to push against the corresponding inner face 156 or end face 154 of one of its adjacent follower jaws 110. Such force applied to the adjacent jaw 110 causes that jaw to move in its segment of the track in response to being pushed by the driver jaw 144. That follower jaw 110 will then correspondingly push against its adjacent or neighboring jaw, causing the neighboring jaw to move along a length of its track segment, and consequently pushing against its neighboring jaw, resulting in all of the jaws being pushed in one direction, in a substantially simultaneous chain reaction, which will either open or close the jaws to either enlarge or close the fastener-retaining aperture formed collectively by the inner surfaces 156 of the jaws.

With continuing reference to FIGS. 12 and 13, by way of example, when the thumb screw 132 is turned, the thumb screw engages the rack 146 of the driver jaw 144, causing the rack and the guide portion 148 in which the rack is formed to move, in this case, to the right as illustrated in FIG. 13. As the guide portion 148 of the driver jaw 144 is moved to the right in its track segment, its end face 154 applies force to the inner surface 156 of the adjacent follower jaw, which is then consequently moved in its track segment in the same direction. This creates a chain reaction between the jaws which are then all moved in the same direction until, in this example illustrated in FIGS. 12 and 13, they are moved into an open position wherein the fastener-retaining aperture is enlarged. In FIGS. 12 and 13, the retainer 112 has been omitted for illustration purposes, although it will be understood that the guide portions 148 of each jaw 110, 144 will be disposed in and travel along a length of the track 122. When the thumb screw 132 is rotated in the opposite direction, the reverse motion happens, causing the guide portion 148 defining the rack 146 to move from the right position in FIG. 13 towards the left position in FIG. 12, causing the chain reaction between the follower jaws 110 to move the jaws in the opposite direction and thus reduce in size or close the fastener-retaining aperture formed by the inner surfaces 156 of the jaws.

It will be seen throughout the figures, such as in FIGS. 12 and 13, that the fastener-retaining aperture 116 is multi-faceted as it is defined by the inner surfaces 156 of the jaws 110 and 144. The jaws are moved until the fastener, such as a nut or head of the fastener or the like, resides within the fastener-retaining aperture 116. The actuator 114 is actuated, such as the thumb screw 132 being rotated, until the inner surfaces 156 of the jaws come into contact with the peripheral edge facets of the fastener. In the case illustrated in the figures herein, six jaws create a hexagonal-shaped fastener-retaining aperture 116, and the six inner faces 156 of the six jaws 110 come into contact with the six sides or facets of the fastener so as to engage every facet of the fastener, as well as the corners formed by the facets of the fastener. In this manner, a very secure grip is formed between the jaws and the fastener and the torque applied to the tool is substantially conveyed uniformly to the fastener which facilitates the grip and rotation of the fastener as it is rotated by the tool.

Figure 14:
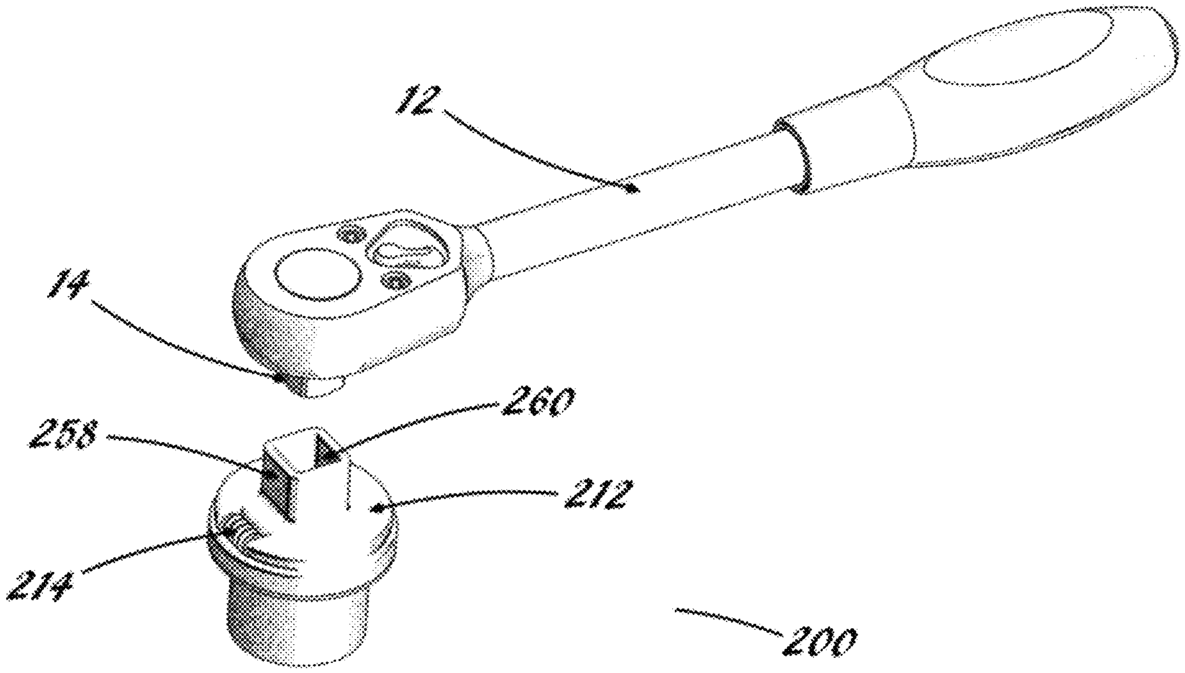
FIG. 14 is a perspective view of the present invention embodied in a socket with a ratchet exploded therefrom.
Figure 15:
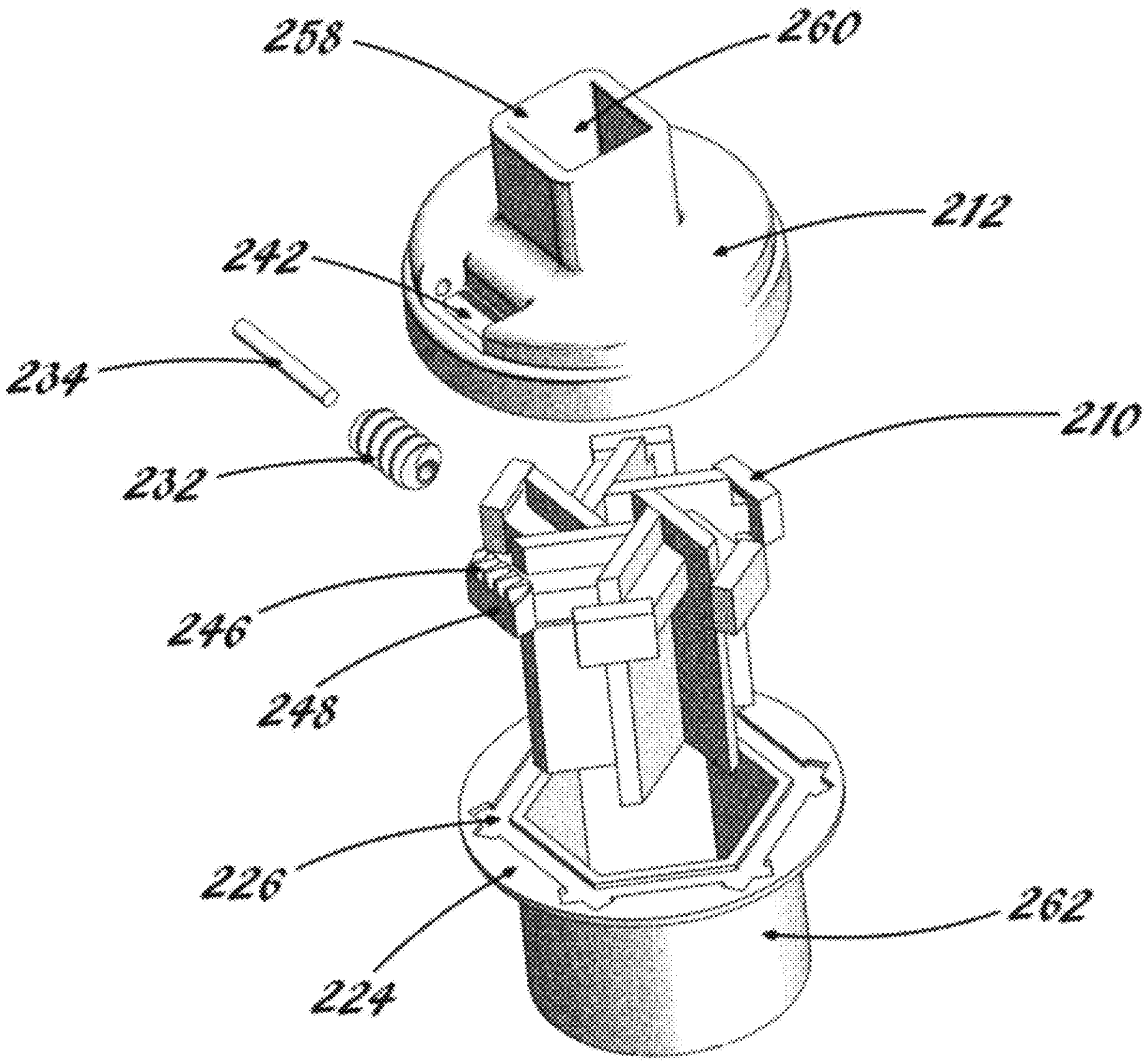
FIG. 15 is an exploded upper perspective view of the socket of FIG. 14.
Figure 16:
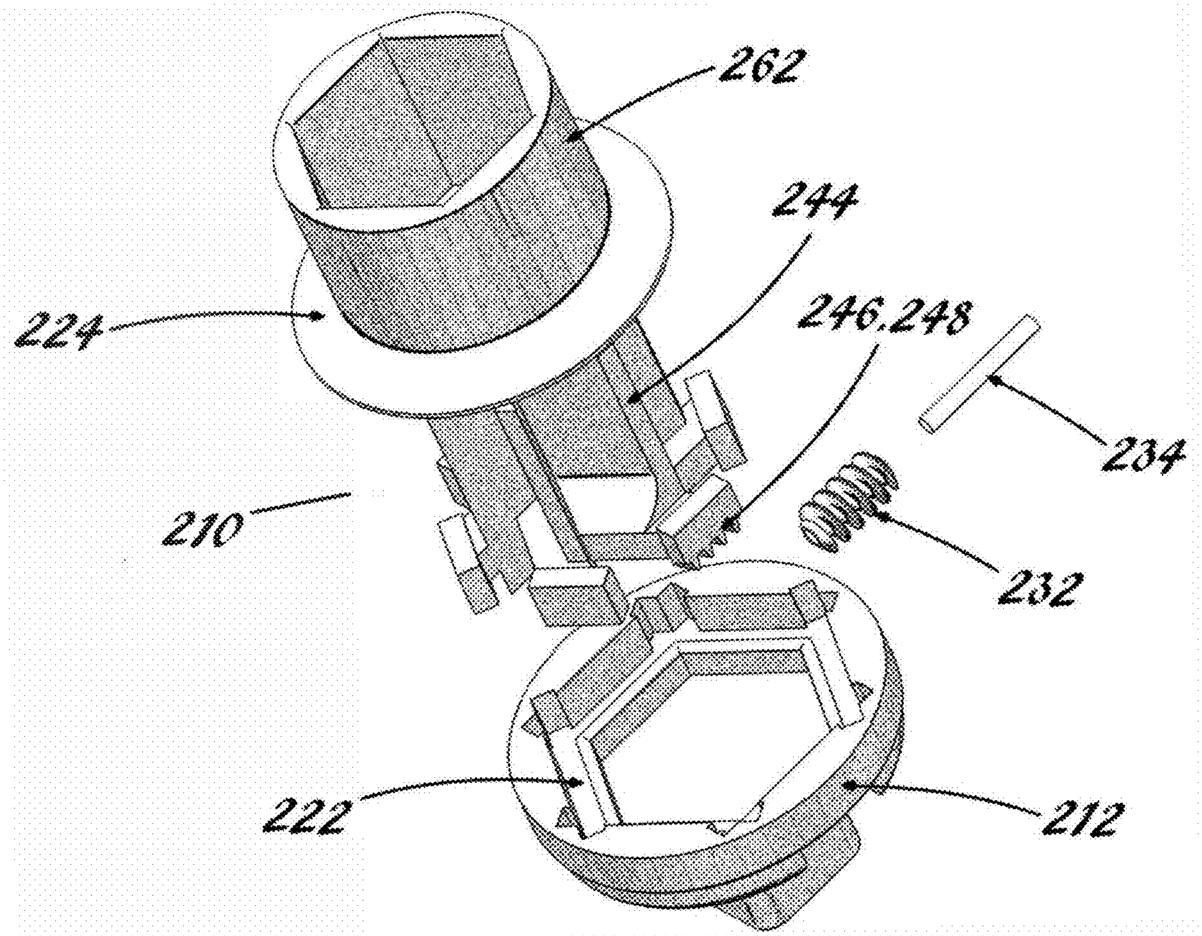
FIG. 16 is an exploded lower perspective view of the socket of FIG. 14.

With reference to FIGS. 14-16, the tool of the present invention may be embodied in a socket form. More particularly, the adjustable jaw assembly components are formed into a socket which is attachable to a ratchet 12 instead of being assembled into a housing of a closed end wrench. In this case, the retainer 212 forms an upper portion having an extension 258 having an opening 260 which receives a drive tang 14 of the ratchet 12. An actuator 214, illustrated as a thumb screw 232 and pin 234 partially reside within recess 242 and extend into the grooved track 222 for engagement with a rack 246 formed in a guide portion 248 of the driver jaw 244. The jaws 210 are slidably disposed within the respective groove segments of the track 222, as described above, and engage one another, as described above, such that as the actuator 214 is adjusted in an analog fashion, the linear displacement of the driver jaw exerts a force on the adjacent jaw, which causes its displacement similar to the driver jaw as it is similarly constrained within its own groove, which in turn exerts a similar force to the next adjacent draw, and so on, resulting in all six jaws moving uniformly together as they are linearly constrained, each to its respective portion of the hexagon track and as they are in direct contact with adjacent jaws on either side and unable to move without moving the neighbor jaw, as described above. It can be seen in FIGS. 15 and 16 that the jaws 210 are elongated so as to extend substantially a length of the socket wall which extends away from the retainer cover 224, which also has a track 226, similar to that described above.

In operation, the socket is placed over a fastener such that the socket wall 262 extends over at least a portion of the fastener. The jaws 210 are then closed, by actuating actuator 214, such as the thumb screw 232 with one's thumb, until the jaws 210 come into contact with the facets of the fastener. If the drive tang 14 of the ratchet 12 has not yet been inserted into aperture 260, it is, and then the ratchet 12 is actuated, as is known in the art, so as to turn the socket tool 200, resulting in the fastener being similarly rotated. In order to release the fastener, the actuator 214 is moved in the opposite direction, which moves the driver jaw 244 in the opposite direction, resulting in the remaining follower jaws 210 moving in the opposite direction as well, as described above. The jaws 244 and 210 collectively and cooperatively form a fastener-retaining aperture and inner surfaces of the jaws form the multi-faceted fastener-retaining aperture and engage the peripheral edges or facets of the fastener such that all the facets and corners of the fastener are engaged with the jaws of the socket tool 200, similar to that described above.

Figure 17:
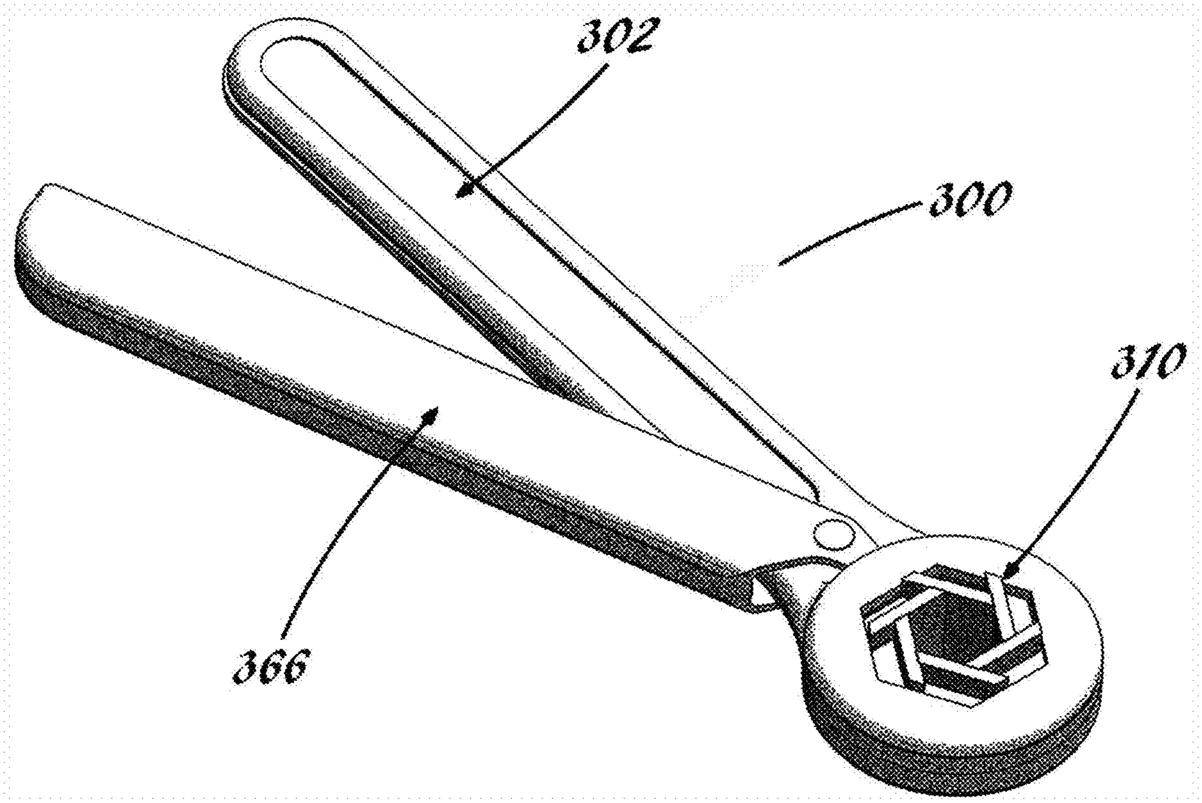
FIG. 17 is a perspective view of the tool of the present invention embodied in a plier wrench.
Figure 18:
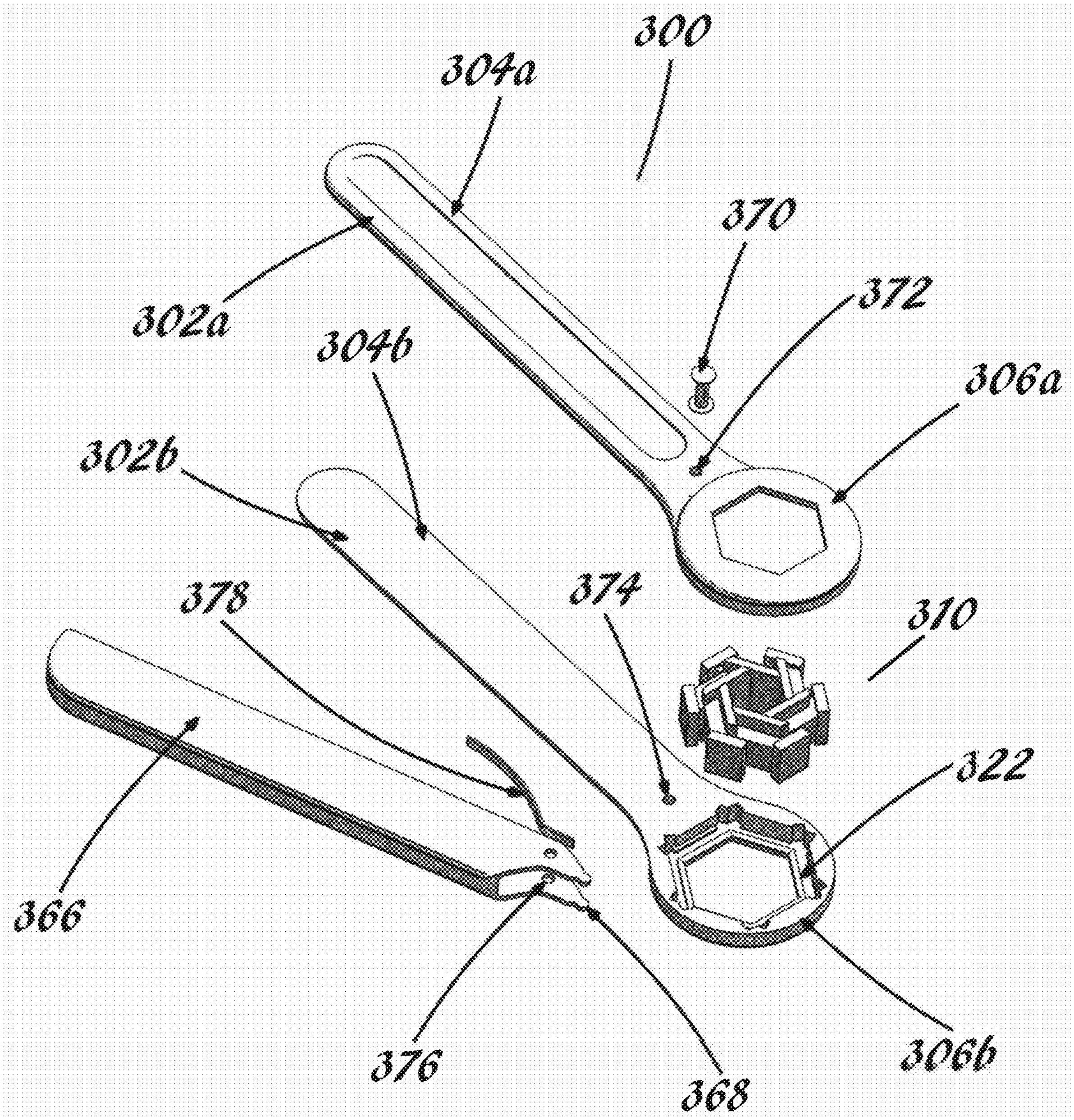
FIG. 18 is an exploded perspective view of the component parts of the plier wrench of FIG. 17.

With reference now to FIGS. 17 and 18, the tool of the present invention may take the form of plier grips 300. The plier grip tool 300 is very similar to the closed-end wrench illustrated above in FIGS. 1-5. In this embodiment, a manually actuated lever 366 is pivotally attached to the handle 302 and used to move the jaws 310. An end 368 of the lever engages with a driver jaw so as to move the driver jaw, and thus the follower jaws in the same manner described above.

With reference to FIG. 18, the handle 302 may be formed into two portions 302*a* and 302*b*, each having a grip portion 304*a* and 304*b* and a closed end jaw housing portion 306*a* and 306*b*. One or both of the closed-end housing portions 306*a* and/or 306*b* may include the open groove segments forming the track 322 in which the guide portions of the jaws 310 are slidably disposed. A rivet 370, or other fastener, may extend through aligned apertures 372, 374 and 376 of the handle 302 and lever 366 in order to connect these components together and provide pivotal connection of the lever 366 to the handle 302. A spring, such as the illustrated leaf spring 378 may be used to bias the actuating lever 366 into an outward position such that as the user releases pressure to the lever 366, it automatically is biased outward, such that the user can then apply pressure again in order to continue to move the position of the jaws 310 with respect to one another. A selector (not shown) could be used in order to select a forward or reverse motion caused by the movement of the lever 366 towards the handle 302, and thus to reverse the direction of the jaws 310 such that they are opened or closed, similar to that described above.

It will be understood that the tool of the present invention grips all of the faces or facets and corners of the fastener to apply the maximum possible torque while preserving the integrity and shape of the fastener. The tool of the present invention can be easily adjusted using a single hand of the operator to securely grip multiple size fasteners, thus eliminating the need for large sets of wrenches, sockets and the like. It is also contemplated by the present invention that it can be incorporated into power tools as well as hand tools while maintaining the principles of operation of the invention. [Para 61] Although several embodiments have been described in detail for purposes of illustration, various modifications may be made without departing from the scope and spirit of the invention. Accordingly, the invention is not to be limited, except as by the appended claims.

What is claimed is:

1. An adjustable fastener engaging tool, comprising:

a retainer having a plurality of linear grooves defining a track;

a plurality of jaws corresponding in number to the number of linear grooves disposed in the retainer, each jaw having a guide portion extending therefrom and into one of the grooves of the track; and an actuator that engages at least one of the jaws;

wherein actuating the actuator translates into linear motion at least one of the jaws engaging the actuator; and wherein adjacent jaws push against one another as the actuator is actuated resulting in the jaws either moving linearly within the grooves in a first direction to enlarge a fastener-receiving aperture cooperatively formed by the jaws or the jaws moving linearly in a second direction within the grooves to reduce the fastener-receiving aperture.

2. The tool of claim 1, wherein the fastener-receiving aperture has a configuration matching a multi-faceted peripheral edge of a fastener.

3. The tool of claim 1, wherein the plurality of jaws comprises six jaws.

4. The tool of claim 3, wherein the six jaws cooperatively define a hexagonal-shaped fastener-receiving aperture.

5. The tool of claim 1, including a retainer plate covering at least a portion of the jaws and the retainer.

6. The tool of claim 5, wherein the retainer plate has a plurality of grooves defining a track that each receives a guide portion of each jaw therein.

7. The tool of claim 5, wherein the retainer has an upper portion defining an opening for receiving a drive tang of a rachet, and the jaws are encircled by a socket wall.

8. The tool of claim 1, wherein the retainer is connected to a handle or has a handle extending therefrom.

9. The tool of claim 8, wherein the tool comprises a closed-end wrench.

10. The tool of claim 8, wherein the actuator comprises a manually actuated lever pivotally attached to the handle and having an end engageable with a driver jaw.

11. The tool of claim 1, wherein each jaw comprises an end face and an inner face, wherein the end face of a jaw slidably engages an inner face of an adjacent jaw as the jaws are moved.

12. The tool of claim 11, wherein the inner faces of the jaws cooperatively define the fastener-receiving aperture and engage the peripheral edges and corners of a fastener.

13. The tool of claim 1, wherein the jaws comprise a driver jaw engaged with the actuator and a plurality of follower jaws.

14. The tool of claim 1, wherein the actuator comprises a thumb screw that engages at least a portion of a driver jaw.

15. The tool of claim 1, including a selector operably coupled to the actuator for selectively preventing forward or reverse movement of the actuator.

16. The tool of claim 1, wherein ends of adjacent grooves intersect with one another.

17. An adjustable fastener engaging tool, comprising:

a retainer having a plurality of linear grooves defining a track;

a plurality of jaws corresponding in number to the plurality of grooves, the jaws comprising at least one driver jaw and a plurality of follower jaws, each jaw having a guide portion slidably disposed in a groove of the track; and a thumb screw actuator that engages at least a portion of only the at least one driver jaw;

wherein each jaw comprises an end face and an inner face, wherein the end face of a jaw slidably engages an inner face of an adjacent jaw, the inner faces of the jaws cooperatively forming a multi-faceted fastener-receiving aperture and engage peripheral edges and corners of a fastener;

wherein adjacent jaws push against one another as the actuator is actuated resulting in the jaws either moving linearly in a first direction to enlarge the fastener-receiving aperture or the jaws moving linearly in a second direction to reduce the fastener-receiving aperture.

18. The tool of claim 17, including a retainer plate covering at least a portion of the jaws and the retainer.

19. The tool of claim 18, wherein the retainer plate has a plurality of grooves corresponding to the number of jaws and defining a track that receives the guide portion of each jaw therein.

20. The tool of claim 18, wherein the retainer has an upper portion defining an opening for receiving a drive tang of a rachet, and the jaws are encircled by an elongated socket wall.

21. The tool of claim 17, including a selector operably coupled to the actuator for selectively preventing forward or reverse movement of the actuator.

22. The tool of claim 17, wherein the retainer is connected to a handle or has a handle extending therefrom and wherein the tool comprises a closed-end wrench.

23. The tool of claim 17, wherein ends of adjacent grooves intersect with one another.

* * * * *